Nov. 3, 1942.    R. W. PORTER    2,300,960
DYNAMOMETER CONTROL SYSTEM
Filed June 27, 1940
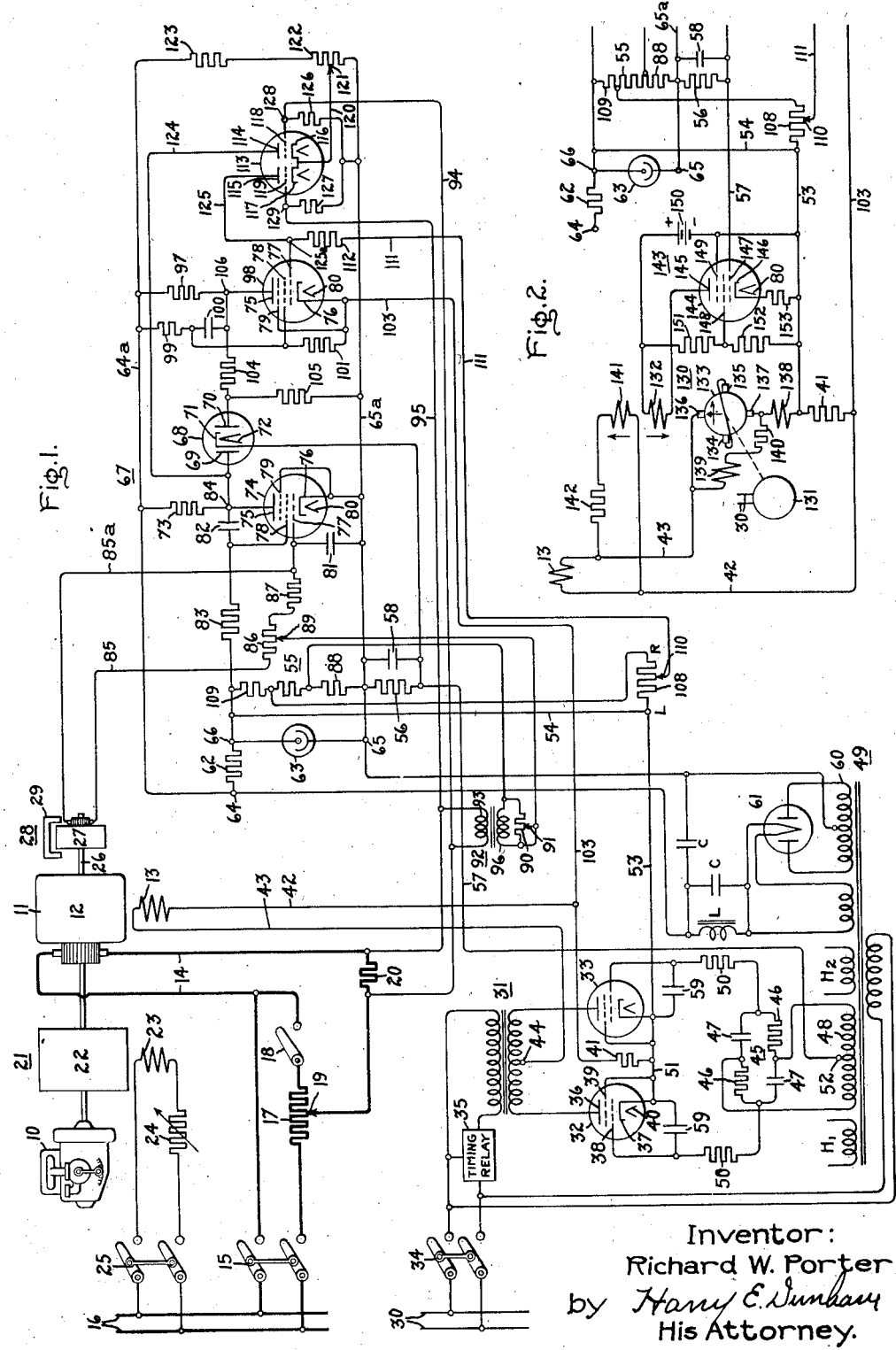
Inventor:
Richard W. Porter,
by Harry E. Dunham
His Attorney.

Patented Nov. 3, 1942

2,300,960

UNITED STATES PATENT OFFICE 2,300,960

DYNAMOMETER CONTROL SYSTEM

Richard W. Porter, Schenectady, N. Y., assignor to General Electric Company, a corporation of New York Application June 27, 1940, Serial No. 342,744

18 Claims. (Cl. 73—51)

This invention relates to electric dynamometers and more particularly to a system for controlling electric dynamometers employed for testing the performance and efficiency of prime movers, such for example, as internal combustion engines of the automotive and aircraft types.

It is an object of my invention to provide a new and improved electric dynamometer control system.

It is another object of my invention to provide a control system which automatically adjusts the excitation of the dynamometer to maintain accurate speed regulation at any desired speed under varying conditions of load imposed by the engine under test.

It is a further object of my invention to provide a field-current control arrangement of adjustable character, which after being adjusted to a given setting, automatically maintains constant field excitation on the dynamometer irrespective of changes in the resistance of the dynamometer field winding due to temperature variations and irrespective of fluctuations in the electrical source of supply from which the excitation current is derived.

It is another object of my invention to provide an improved electric dynamometer control system whereby control may be transferred smoothly and quickly from one regulating function to the other regulating function and without the use of switches and the like.

It is a further object of my invention to provide means for obtaining a smooth variation in the dynamometer field current from zero up to normal when the dynamometer is being started from rest as a motor in order that a smooth torque may be obtained.

It is another object of my invention to provide a dynamometer control system with adjustable maximum speed limits when the current regulating function is in operation and with adjustable minimum field current limits when the control system is being employed for regulating speed.

It is still another object of my invention to provide an improved dynamometer control system which prevents overloading of the dynamometer beyond a predetermined value of armature current and which shall be operative with the dynamometer operating either as a motor or as a generator.

It is a further object of my invention to provide an improved electric dynamometer control system adapted to regulate either the field current or the speed of the dynamometer when it is operating either as a motor to drive the engine under test or as a generator to constitute a load for the engine.

It is another object of my invention to provide a control system which is adapted to control the operation of an electric dynamometer when it is being used in conjunction with an auxiliary loading device.

In carrying out certain tests on prime movers, and particularly internal combustion engines of the automotive and aircraft type, it is customary to couple a dynamoelectric machine with the engine under test and to operate the machine as a power absorption generator for converting the mechanical energy developed by the engine into electrical energy and delivering the same to suitable current translating or consuming devices or to a source of electrical supply. Furthermore, it has been customary to supply the dynamoelectric machine with current from an external source of supply to operate it as a motor for the purpose of cranking and "running-in" the engine to overcome its initial stiffness and for making friction tests. In such cases the dynamoelectric machine may be a simple direct-current machine of the "cradled" dynamometer type having its field frame trunnioned in bearings and free to rotate except as restrained by a scale. The torque delivered by or to the apparatus under test is transmitted to the field frame by electromagnetic interaction of the rotor and field current. Or, if desired, the field frame of the dynamoelectric machine may be mounted rigidly, and its input energy, or its output energy to a consumption circuit or device measured in a conventional way by suitable means such as a wattmeter.

The present invention relates to a system for controlling the operation of the dynamometer. In carrying my invention into effect in its preferred form, the field winding of the dynamometer is excited from an alternating current circuit through a full-wave rectifier including a pair of electric valves. In a modification the field winding of the dynamometer is energized by an exciter in the form of a dynamoelectric amplifier of the armature reaction excited type having a control field winding. An electronic regulator or control system acts automatically to vary the conductivity of the rectifying valves or to control the current transmitted to the control field winding of the dynamoelectric amplifier, as the case may be, in accordance with variations in the dynamometer speed thereby changing the dynamometer field current to maintain constant speed under varying conditions of load. A manual control device provides means for adjusting the setting or changing the standard of operation of the regulator to regulate for different predetermined dynamometer speeds regardless of changes in the load imposed by the engine under test.

Under certain conditions of operation it is often desired to have the speed of the dynamometer vary in accordance with the torque. The invention therefore contemplates as part of the same control system means whereby the field current of the dynamometer is maintained substantially constant irrespective of fluctuations in the source of supply and changes in resistance of the field winding due to temperature variations. A manual control device is provided for adjusting the setting of the regulator to regulate for different predetermined values of field current. The control system includes electronic means for transferring smoothly and quickly from the speed regulating function to the field regulating function and vice versa. When the device is employed for regulating speed, the adjustment of the field-current regulating element determines the minimum field which the speed regulator can produce. When the field regulating function is in use, the speed adjustment determines the maximum speed which can be produced. Thus, each regulating function may be used to act as a safety limit for the other.

During certain operating conditions, were it not for certain safety features, the dynamometer might become overloaded either when operating as an absorption generator with the speed regulator in action or as a motor to drive the engine under test. Accordingly, my invention contemplates the inclusion of means which act in response to the dynamometer armature current for modifying the action of the speed or field regulating elements under certain conditions so as to prevent the dynamometer armature current from exceeding a maximum adjustable predetermined value. The load limit device is operative with the direct-current dynamometer operating either alone or in conjunction with additional manually-controlled loading apparatus.

My invention will be better understood from the following description taken in connection with the accompanying drawing, and its scope will be pointed out in the appended claims. In Fig. 1 of the drawing I have illustrated an electronic control system arranged in accordance with my invention for controlling the operation of an electronic-exciter which excites the field of a dynamometer of the direct-current generator or motor type employed for testing an internal combustion engine. Fig. 2 shows a modification in which the electronic exciter of Fig. 1 is replaced by a dynamoelectric amplifier of the armature reaction-excited type.

Referring to Fig. 1 of the drawing, in order to illustrate the principles of my invention, I have diagrammatically shown a prime mover 10 in the form of an internal combustion engine mechanically connected to a dynamometer 11. The electric dynamometer 11 which is capable of acting either as a direct current generator or motor comprises a rotatable armature 12 and a separately excited field winding 13. The dynamometer armature terminals 14 are adapted to be connected by means of a switch 15 to a direct current power system 16 so that with the dynamometer acting as a generator mechanical energy developed by the engine 10 may be converted into electrical energy in the armature 12 and pumped back into the supply lines 16. On the other hand, energy may be supplied to the armature 12 from the system 16 when the dynamometer is operating as a motor to drive the engine under test. If desired, by maintaining the switch 15 in the open position, the dynamometer when acting as a generator may be connected by closing a switch 18 to a consuming device such as a loading resistor 17 to dissipate the absorbed energy in the form of heat. The resistor 17 may also be employed as a starting resistor during the period when the dynamometer is being brought up to speed as a motor. A manually controlled variable contact 19 provides means for inserting any desired portion of the resistor 17 in the dynamometer armature circuit. Connected also in the dynamometer armature circuit is a resistor 20, the function of which will be later explained. The field frame of the dynamometer may be rigidly mounted and its output or input measured by means of a wattmeter in the usual manner. However, I prefer to employ a conventional "cradled" dynamometer by mounting the field frame in bearings and opposing its rotation by the customary scale beam. These arrangements for the torque measurement, however, are well known to those skilled in the art, are not a part of my invention, and, therefore, are omitted for the sake of simplicity in the description and drawing.

In certain applications a very large torque-absorption capacity is required to fully load the engine under test. It being impracticable in such cases to build dynamoelectric machines such as 11 of adequate capacity, I may provide an additional loading device such as either an hydraulic dynamometer or an eddy-current dynamometer 21. In the arrangement illustrated I have shown a dynamometer of the latter type having a rotor 22 mechanically connected to the engine under test and a field winding 23 connected in circuit with a variable resistance element 24. The field winding 23 may be energized from any suitable source of direct current and in the illustrated embodiment I have shown it arranged to be connected to the source of supply 16 through a switch 25. The two dynamometers may conveniently be mounted on a common base and with their rotors 12 and 22 coupled together. The stators or field frames supporting the windings 13 and 23 are also preferably strapped rigidly together by a pair of torque-transmitting frames (not shown) and the combined torque reaction may be measured on a single beam scale or automatic scale in either direction of rotation. The torque reaction on the scale is thus the net torque delivered by or to the combined unit.

The shaft 26 to which the prime mover 10 is connected drives the armature 27 of a small electric tachometer or pilot generator 28, the generated voltage of which varies in direct proportion to the speed at which its armature member is rotated. A permanent magnet 29 provides the necessary excitation flux. I wish to point out that while I have shown a pilot generator of the direct current type, it is not my intention to limit the invention in this respect. For example, an alternating current generator and a rectifier may be employed if desired.

The field winding 13 of the dynamometer is excited by an electronic amplifier including an alternating current circuit 30 and a full-wave rectifier arrangement comprising a transformer 31 and electric valves 32 and 33. The primary winding of the transformer is connected to the source of supply 30 through a switch 34 and a timing relay 35. The electric valves 32 and 33 are each provided with an anode 36, a cathode 37, a control electrode 38, a screen grid 39, and a heater element 40. The respective anodes of the two valves are connected to opposite terminals of the secondary winding of the transformer 31. The cathodes are connected to each other and in a load circuit including a resistor 41, conductor 42, field winding 13, conductor 43, and the mid-point 44 of the secondary winding of the transformer 31.

The electric valves 32 and 33 may be of any of the several types well known to those skilled in the art, but I prefer to use rectifying valves of the vapor electric discharge type in which a main discharge takes place between the anode and cathode only during each half cycle of the supply current when the anode is positive with respect to the cathode, and in which the particular point in the cycle of the anode voltage at which the current starts to flow in the valve is determined by the potential on its control electrode, but in which the current once it starts to flow through the valve may be interrupted only by reducing its anode potential below the critical value.

It should be understood that the electronic exciter just described may be of the polyphase type, and thus be energized from a polyphase source of supply, as will be clear to those skilled in the art.

In order to control the output of the electronic exciter arrangement—and thereby the amount of current flowing in the field winding 13—I have provided a phase shifting circuit comprising a bridge 45 having resistance elements 46 in two opposite arms and having capacitors 47 in the other opposite arms. One conjugate portion of the bridge 45 is connected across a secondary winding 48 of a transformer 49, the primary winding of which is adapted to be connected to the alternating current circuit 30 through the switch 34. The other conjugate portion of the bridge 45 is connected to the control electrodes 38 through current limiting impedances, such as resistance elements 50, while the common cathode connection 51 of these two valves is connected to the electrical midpoint 52 of the secondary winding 48 through a circuit including conductors 53 and 54, a resistor 55 having impressed thereacross a substantially constant potential, a resistor 56 having impressed thereacross a potential which varies in a manner to be explained hereinafter, and a conductor 57. A smoothing capacitor 58 is preferably connected in parallel with the bias resistor 56 to serve as a means of absorbing extraneous voltage variations. In certain cases it may be desirable to connect a small capacitor 59 between each of the control electrodes and the cathode of the valves 32 and 33, respectively. The screen grid 39 of each valve may be joined directly to the common cathode connection 51.

The valves 32 and 33 have a critical grid or control voltage below which they will not begin to pass current even though their anode voltages are positive. Since with the foregoing arrangement the alternating component of the voltage applied to the control electrodes 38 lags the potential applied to the anodes 36 by an angle of approximately 90 electrical degrees, the valves are prevented during each cycle from passing current until the anode voltage has progressed through an appreciable part of its positive half cycle of variation. Furthermore, by varying the direct current component of the control voltage corresponding to the net voltage appearing across resistors 55 and 56, this point in the cycle at which the valves begin to pass current may be advanced or retarded, so as to control the average value of the current flowing between the anodes and the cathodes. This variation of the direct or continuous component of the control voltage has the effect of shifting the alternating component plus or minus so that corresponding values of potential will be obtained earlier or later in the cycle.

Before energizing the anodes 36 of the valves 32 and 33 it is desirable to allow a short period of time for the heating of the cathodes 37 by their heater elements 40. These heater elements are adapted to be connected to a secondary winding $H_2$ of the transformer 49 and are thereby supplied with alternating current from the source of supply 30 upon closing the switch 34. These connections are not shown in order to avoid confusion in the drawing. The timing relay 35 prevents energization of the primary winding of the transformer 31 until the cathodes are heated to their operating temperature.

In order to provide a constant source of reference voltage, I employ a suitable arrangement, such as a rectifier circuit, which may comprise a secondary winding 60 of the transformer 49, a full-wave rectifier element 61 connected to the winding 60, a suitable filter arrangement provided in the output circuit comprising a reactor L and capacitors C, and a resistor 62 and glow discharge device 63 connected in series circuit relation across the positive and negative direct current terminals 64 and 65, respectively. Variations in voltage across the terminals 64 and 65 will not materially alter the voltage across the glow discharge tube 63, but these voltage variations will appear across the resistor 62. The voltage across the tube 63 is impressed on the resistor 55.

The substantially constant voltage which appears across the resistor 55 at points 65 and 66 serves as a reference potential for comparison with different voltage components varying in accordance with certain characteristics or conditions to be controlled. One condition is the speed of the dynamometer; another is the field current of the dynamometer. An electronic regulator 67 is provided for variably energizing the resistor 56 in the control circuit in accordance with these conditions. To make the description clear, it is pointed out that the field current regulating function is ineffective when the speed regulating function is in operation except to control the minimum value of field current which the speed regulating element can produce. In a similar manner, the speed regulating function is ineffective when the field current regulating function is in operation except to determine the maximum speed which the current regulating element can produce. That is, the electronic regulator 67 maintains the speed of the dynamometer 11 at a substantially constant value so long as the current transmitted to the field winding 13 remains greater than a predetermined permissible minimum value, and under certain conditions, if desired, so long as the armature current transmitted to or by the armature 12 does not exceed a predetermined maximum value. If the field current required to maintain the dynamometer at this constant speed becomes less than the predetermined minimum value the speed is permitted to vary and the minimum value of field current is maintained. If the maximum value of the armature current is exceeded while the dynamometer is operating as a motor the dynamometer excitation is increased, and if it is exceeded when the dynamometer is operating as a generator the excitation is decreased, without regard to the speed, and the maximum value of armature current is maintained.

The regulator 67 operates in a similar manner to maintain a constant field current on the dynamometer 11, when it is desired to allow the speed to vary with the torque, so long as a predetermined maximum speed is not exceeded. If the armature current is exceeded the field current is modified as already explained for motoring action but the current limit feature is ineffective to reduce the field current below the minimum field setting in the generating direction. This restriction can be avoided by connecting conductor 124 to the cathode 71 of valve 68 instead of to the common junction 84. There are, however, two principal reasons why I prefer not to do this. First, it is not desirable to permit the field to go to zero, even momentarily while the motor is connected across the line, and the possibility of complete field removal caused by faulty operation of any part of the regulator is less with the present connection. Second, resistor 56 necessarily has a very high resistance, such as for example, a megohm. There is some slight possibility of erratic operation if a tube and socket, which might have a comparable value of leakage resistance, be connected across 56.

The regulator 67, as stated hereinbefore, includes a system for transmitting variable amounts of unidirectional current through the resistor 56 to control the conductivity of the electric valves 32 and 33 in response to the above described controlling influences. To this end I employ an electric valve means 68 having anodes 69 and 70, a common cathode 71, and a heater element 72. This valve through its two conducting paths serves as a means for smoothly and quickly transferring from speed to field current control, and vice versa, without the interposition of mechanical switches and it also serves the purpose of automatically transferring the control from field current to speed regulation at a predetermined maximum speed and from speed to field current regulation at a predetermined minimum field current. Furthermore, as will be later explained, the field current and speed regulator actions may be modified by means including this valve when a predetermined maximum current in the armature 12 is exceeded.

The tube or valve 68 may be any one of the several types of double-diode rectifier tubes, such for example, as a hot cathode bi-phase high vacuum pure electron discharge type rectifying tube. I wish to call attention to the fact that, while I prefer to employ the arrangement shown, if desired, and within my invention, I could just as well employ two tubes of similar characteristics with their cathode electrodes connected together. Furthermore, the anodes may be connected together instead of the cathodes by rearranging the control potentials. Such modifications are shown and claimed in the Livingston Patent 2,109,352, assigned to the same assignee as the present invention. The characteristics of the valve 68 are such that current will flow to the cathode 71 only from that one of the anodes 69 and 70 having the higher positive potential with respect to the cathode, so that if a high resistance such as 56 is connected in series with the cathode 71, the cathode potential will be essentially the same as that of the more positive anode and will be independent of the other anode. As will be understood from the foregoing explanation of the theory of operation of the tube 68, if one of the anodes, such as 69, is connected to be energized in accordance with speed variations of the dynamometer and to such a value that it is more positive than the anode 70, the potential across the resistor 56 will be controlled in accordance with the speed variations and the regulator 67 will regulate speed. Similarly, if the anode 70 is connected to be energized in accordance with field current variations and to such a value that it is more positive than the anode 69, the potential variations across the resistor 56 will be controlled in accordance with field current variations and the regulator 67 will regulate the field current in the winding 13. To this end, that is for selectively controlling the conductivity of the two electronic paths of the valve means 68, I provide a pair of electric circuits energized by means including the direct current circuit having terminals 64 and 65.

Consider first the circuit which is employed for carrying out the speed regulating function. This circuit includes a serially connected impedance element such as a resistor 73 and an electronic amplifying device or valve 74. The valve 74 is preferably of the high vacuum type and comprises an anode 75, a cathode 76, a control electrode 77, preferably screen and suppressor grids 78 and 79 respectively, and a heater element 80. A capacitor 81, the function of which will be explained hereinafter, is shown connected between the control electrode 77 and the cathode 76. The suppressor grid 79 is connected directly to the cathode 76, while the screen grid 78 is connected to the anode 75 through a capacitor 82 and to the positive terminal 66 of the direct current supply through a resistor 83. The series circuit including the resistor 73 and the principal electrodes 75 and 76 of the valve 74 are connected to the positive and negative terminals 64 and 65 respectively of the direct current source of supply. The anode 69 of the transfer valve 68 is connected at 84 to the anode 74 and resistor 73. Thus, the resistor 56 is connected in parallel with the amplifier or valve 74 through the anode 69 and the cathode 71 of the valve 68.

The common juncture 84 between the resistor 73 and the anodes 75 and 69, rises and falls in potential depending upon the conductivity of the valve 74. For example, the voltage from anode to cathode of the valve 74 and, therefore, that across the resistor 56, is reduced to a very low positive value when the anode current is a maximum, because of the large potential drop through the resistor 73. This voltage rises as the anode current of the valve 74 decreases, the potential of the point 84 approaching as a limit the potential of the positive terminal 64 of the source of supply.

The direct current component of the bias voltage connected between the common cathode connection 51 of the valves 32 and 33 and the midpoint 52 of the transformer winding 48, as already explained, includes a substantially constant negative potential derived from the resistor 55 and the serially connected opposing potential derived from the resistor 56. When the potential across the resistor 56 is a minimum, the fixed potential across the resistor 55 biases the control electrodes 38 of the valves 32 and 33 with a direct current voltage which is negative with respect to their associated cathodes 37, thereby causing these valves to fire later in the cycle with the result that the average value of the current in the dynamometer control field winding 13 is low. Consequently, increasing the potential across the resistor 56 tends to reduce this negative bias (or make the control electrodes more positive) to increase the dynamometer field current by causing the valves 32 and 33 to fire earlier in the cycles of their respective positive anode voltages.

I shall now describe the apparatus employed for energizing the control electrode 77 of the amplifier 74 with an electrical quantity which varies in accordance with speed variations of the dynamometer 11 to produce proportional amplified variations in the potential across the resistor 56. In accordance with the arrangement disclosed, variations in the potential of the control electrode 77 with consequent variations in the amount of current delivered to the field winding 13 are brought about by a control which depends for its operation on the difference between a constant reference voltage and a speed-dependent voltage generated by the pilot generator 28. The positive and negative terminals 85 and 85a, respectively, of the pilot generator are connected across a voltage divider or potentiometer 86 and a series resistor 87, so that these two elements combined have impressed upon them the full voltage generated by the pilot generator 28.

By means of a section 88 of the resistor 55, a fixed component of the constant glow tube voltage is derived to serve as a reference or standard for comparison with the variable voltage of the pilot generator. The negative lead 85a from the pilot generator is connected to the control electrode 77. A manually controlled variable contact or connection 89 of the potentiometer 86 is connected to the positive end of the resistor section 88 through an adjustable portion of a variable resistance 90. The negative end of the resistor section 88, which is connected to the negative terminal 65, is electrically connected to the cathode 76 of the valve 74 through the common negative bus or lead 65a. I wish to point out that while I have shown invariable means 88 for deriving the reference voltage, an adjustable potentiometer may be employed, if desired, so that manually adjustable voltages may be obtained but which will nevertheless remain constant for any setting of the potentiometer.

The resistance element 90 with its adjustable contact 91 forms part of a stabilizing device, the operation of which will be more fully described hereinafter. The stabilizing device also includes a transformer 92, the primary winding 93 of which is connected, by means of conductors 94 and 95, across the resistance element 20. The secondary winding 96 of the transformer 92 is connected across the variable resistance element 90. Since the resistance element 90 is connected to the dynamometer armature circuit through a transformer, it will be clear that its energization depends upon the rate of change of current in the dynamometer armature and consequently a correction is introduced into the circuit of the control electrode 77 which is proportional to this rate of change. This corrective factor introduced into the control circuit effectively prevents hunting and thus stabilizes the operation of the system.

When the regulator is being employed to regulate the dynamometer speed, neglecting the effect of the stabilizing device, it will thus be seen that the control electrode 77 is energized in accordance with the difference between two normally opposed voltage components, one of which remains substantially constant and the other of which varies in magnitude substantially in proportion to the dynamometer speed.

Movement of the adjustable connection or contact 89 of the potentiometer toward the right from the position shown, or toward the negative terminal 85a, has the effect of setting the regulator for a higher speed inasmuch as the valve 74 is thereby made to pass more current which causes a lower positive biasing potential across the resistor 56 and therefore a lower current in the control or field winding 13. Consequently, if the dynamometer is operating as a motor it speeds up, as will be understood by those skilled in the art, and also, if it is operating as a generator, a reduction in its field current tends to decrease the dynamometer output or the load on the engine resulting in an increase in speed. Thus the maximum speed setting corresponds to the condition when the contact is moved all the way to the right. Conversely, movement of the contact 89 to the left sets the regulators for a lower speed.

Consider now that portion of the regulator circuit which is employed for the field current regulating function when it is desired to allow the speed to vary with the torque. This circuit includes a serially connected impedance element such as a resistor 97 and an electron discharge amplifying device 98 which may be identical to the valve 74 and which has its corresponding electrodes identified by like reference characters. The suppressor grid 79 is connected directly to the cathode 76. The screen grid 78 is connected respectively to the positive conductor 64a of the direct current source of supply through a resistor 99, to the anode 75 through a capacitor 100, and to the cathode 76 through a resistor 101. The anode 75 and the cathode 76 are connected in a circuit including a source of potential derived from the resistor 62 which may be traced as follows: Positive terminal 64, conductor 64a, resistor 97, anode 75, cathode 76, conductor 103, field resistor 41, common cathode connection 51, conductors 53 and 54, and the less positive direct current terminal 66. The anode 70 of the valve 68 is connected to the anode 75 of the valve 98 through a resistor 104 and to the negative conductor 65a through a resistor 105. Thus the resistor 56 is connected in parallel with the resistor 105 through the anode 70 and the cathode 71 of the valve 68.

The point 106 at the juncture of the resistor 97 and the anode 75 of the valve 98 rises and falls in potential in accordance with the degree of conductivity of the valve 98. For example, the point 106 is maintained at a relatively high potential when the anode current in the valve 98 is very small but becomes less positive as the anode current increases due to the drop in potential through the resistor 97. Consequently, at low values of current through the valve 98, the resistors 104 and 105 will have relatively high potentials impressed upon them so that the potential at anode 70 of valve 68 will rise to a relatively high positive value, causing the voltage to rise across the biasing resistor 56 to effect an increase in the flow of current in the field winding 13. Conversely, higher values of current through the valve 98 cause the potential at the point 106 and the anode 70 to become less positive thereby decreasing the voltage across the resistor 56 provided the speed does not become so high that the voltage on anode 69 is higher than that on anode 70, and causing a decrease in the dynamometer field current.

The input electrodes, that is, the cathode 76 and the control electrode 77 of the amplifying valve 98 are energized in accordance with the difference between a constant reference voltage of adjustable value derived from the resistor 55 and a voltage which is variable in accordance with the dynamometer field current. A component of the constant glow tube voltage is obtained by connecting a potentiometer or voltage divider 108 across a section 109 of the resistor 55. Adjustable amounts of the potentiometer voltage obtained by a manually adjustable contact or connection 110 are connected in opposition to the variable voltage appearing across the field resistor 41 by a circuit including conductor 103, resistor 41, conductor 53, potentiometer 108, conductor 111, and a resistor 112.

It will be seen that movement of the adjustable contact 110 to the right increases the negative direct current bias voltage on the control electrode 77 of the valve 98 and the effect will be to set the regulator for an increased field current. Conversely, movement of the contact 110 to the left from the position shown produces a smaller negative bias so that the regulator is set for a lower field current, the minimum value of field current corresponding to the condition when the contact 110 is moved all the way to the left.

With the anodes 69 and 70 of the transfer valve 68 connected as shown it will be seen from the foregoing description that by means including the two electronic conductive paths of the electric valve 68 the conductivity of the electric valves 32 and 33 may be controlled selectively from that circuit of the speed responsive and field current responsive circuits which produces the predominating voltage or control potential on the respective anodes 69 and 70. Under normal operation, by moving the adjustable connection or contact 110 toward the left or positive end of the potentiometer 108, the potential on the anode 70 may be lowered to such an extent that the anode 69 will always be more positive throughout a wide speed range, and the regulator will regulate speed so long as the speed regulator does not attempt to reduce the field current below the minimum value corresponding to the setting of the contact 110. When such a condition arises the anode 70 becomes more positive than the anode 69, so that the field current regulator assumes control and the dynamometer, field current is maintained at the value corresponding to the setting of the adjustable contact 110, the speed being permitted to vary at will. Similarly, by moving the adjustable contact 89 toward the right or negative end of the potentiometer 86, the potential on the anode 69 may be lowered to such an extent that the anode 70 will always be more positive throughout a wide range in values of field current, and the regulator will regulate the field current so long as the contact 110 is not set at such a value as to cause the speed to rise to a higher value than that dictated by the setting of the adjustable contact 89 or as long as changing load on the dynamometer or changing speed of the test engine does not cause the dynamometer speed to exceed the speed setting of the adjustable contact 89. When such a condition arises the anode 69 becomes more positive than the anode 70, with the result that the speed regulator assumes control, and the dynamometer operates at a maximum speed corresponding to the setting of the adjustable contact 89, the field current being permitted to vary at will. The foregoing operations may take place with the dynamometer operating either as a generator or as a motor.

In some cases, if there were no safety device the dynamometer 11 might be greatly overloaded causing serious damage. This is particularly true in the case where a large engine is being tested by means of a comparatively small capacity direct-current dynamoelectric machine such as 11 operating in conjunction with a larger hydraulic or eddy-current loading device. The larger unit in such case absorbs most of the power, but the smaller direct-current dynamometer takes up variations in the total power in such a way as to hold the speed constant. Under such conditions of operation there is always the danger that the regulator will drive the small direct-current dynamometer to dangerously high values of armature current in attempting to maintain the speed at a constant value if, for example, the load taken by the large loading unit or dynamometer is suddenly changed or the engine fails. In the latter event the dynamometer would tend to operate as a motor to drive the larger unit. Accordingly, I provide means for modifying the action of the speed regulator to reduce automatically the field excitation of the dynamometer whenever the armature current exceeds a predetermined safe maximum value in the generating direction, until the armature current falls to the predetermined maximum value or until the field current is reduced to the minimum value as determined by the setting of the adjustable contact 110. Conversely, if the armature current becomes too large in the motoring direction the action of the speed regulator is modified to increase automatically the field excitation of the dynamometer until the armature current drops to the predetermined maximum value. Therefore, the effect of this load limiting function of the regulator so far as the overall operation of the system is concerned is to keep the armature current within limits, plus and minus, irrespective of the setting of the speed regulator for the respective generating and motoring actions.

In the arrangement illustrated, this comprises an electric valve means 113 preferably of the high vacuum, high amplification, twin-triode type having a pair of electric discharge paths including anodes 114 and 115, cathodes 116 and 117, and control members or grids 118 and 119, respectively. Although the electric valve means 113 is shown as being of the type in which both electric discharge paths are enclosed within the same envelope, it is to be understood that I may employ a pair of electric discharge paths which are each mounted within a separate envelope, and that the cathodes thereof may be connected together. The cathodes 116 and 117 are joined together and their common point is connected by a conductor 120 to a manually adjustable contact or connection 121 of a potentiometer or balancing resistor 122. The potentiometer 122 is connected in series circuit relation with a resistor 123 across the positive and negative conductors 64a and 65a, respectively, leading from the direct-current source of supply.

The anode 114 is connected to the anode 69 of the transfer valve 68 by means of a conductor 124. The conductive path including the anode 114 and the cathode 116 is thus energized from the direct-current source of supply by a circuit which may be traced as follows: positive line 64a, resistor 73, juncture 84, conductor 124, anode 114, cathode 116, conductor 120, and adjustable contact 121 of potentiometer 122. The anode 115 is connected by a conductor 125 to the juncture 125a of the control electrode 77 of the electric valve 98 and the resistor 112. Thus the conductive path including the anode 115 and the cathode 117 is energized from the direct-current source of supply by a circuit which may be traced as follows: positive terminal 64, resistor 62, conductor 54, the active portion of potentiometer 108, contact 110, conductor 111, resistor 112, juncture 125a, conductor 125, anode 115, cathode 117, conductor 120, and adjustable contact 121 of potentiometer 122.

The control electrodes 118 and 119 are connected through resistors 126 and 127, respectively, to the negative conductor 65a of the source of supply. The function of resistors 126 and 127 is to act as a balanced voltage divider for the potential drop across resistor 20. The valve 113 including the two conductive paths is preferably normally biased somewhat beyond cut-off by means of the potential applied to the common cathodes from the potentiometer 122 which potential biases these cathodes positively relative to the control electrodes 118 and 119. The juncture 128 of the control electrode 118 and the resistor 126 is connected by the conductor 94 to one side of the resistor 20 in the armature circuit of the dynamometer 11, while the juncture 129 of the control electrode 119 and the resistor 127 is connected to the other side of the resistor 20 by the conductor 95.

As will be clear to those skilled in the art, with a given field current and direction of rotation, when the dynamometer is operating as a motor its armature current, and, consequently, the current in the resistor 20, will flow in one direction and when the dynamometer is operating as a generator its armature current and the current in this resistor will flow in the opposite direction. Consequently, one of the control electrodes 118 and 119 will be made more positive (or less negative) with respect to the common cathodes 116 and 117 for generator action of the dynamometer, while the other control electrode will be made more positive (or less negative) for motor action.

Assume that for generator action the armature current flows through the resistor 20 in a direction such that the left end of the latter to which the conductor 94 is connected is more positive than the right end to which the conductor 95 is connected. The control electrode 118 is thus made more positive with respect to its cathode 116, while the control electrode 119 is made more negative with respect to its cathode 117. The converse is true for the dynamometer operating as a motor. Consequently, with the speed regulator in action, if the armature current through the resistor 20 becomes excessive in the generating direction, the righthand portion of the valve 113 including the anode 114 and the cathode 116 becomes conductive. Current therefore flows through the resistor 73 and in so doing will lower the potential on the anode 69 of the transfer valve 68, decreasing the positive biasing potential across the resistor 56, with the result that the firing point of the valves 32 and 33 is retarded and the current flowing in the control or field winding 13 is reduced. The action of the speed regulator will thus be modified when the armature current becomes excessive to reduce the field excitation to a value sufficient to prevent the armature current from exceeding the predetermined maximum value or until the field current is reduced to the minimum value as determined by the setting of the contact 110. In other words, the righthand conductive portion may reduce the field excitation up to the point at which the potentials of the anodes 69 and 70 become substantially equal, under which condition the potential across the biasing resistor 56 will be equal to that across the resistor 105. As will be clear the potential across this resistor and the anode 70 is determined by the field current and by the setting of the adjusting member 110.

If the armature current becomes excessive in the motoring direction, the control electrode 119 becomes more positive and the lefthand conductive portion including the anode 115 and cathode 117 begins to pass current. Since this current flows through the resistor 112, the control electrode 77 of the electric valve 98 is thus made more negative relative to the cathode 76 causing this valve to pass less current. This reduction in current flow through the valve 98 increases the voltage across the resistors 104 and 105 so that the potential on the anode 70 of the transfer valve 68 is increased. Consequently, the positive biasing potential across the resistor 56 is increased with the result that the firing point of the valves 32 and 33 is advanced and the current flowing in the field or control winding 13 of the dynamometer is increased until the armature current drops to the predetermined maximum value. It will thus be seen that either the action of the speed regulator and the pilot generator or the action of the field current regulator may be modified in the case of an excessive motoring current to render them ineffective in performing their regulating functions.

By means of the manually adjustable contact or connection 121 of the potentiometer or voltage divider 122 the regulator may be set to keep the armature current within various adjustable predetermined maximum limits. In other words, the standard of operation may be changed.

With the apparatus thus far described, assume that the dynamometer is operating either as a generator delivering its output energy to the supply system 16, or as a motor receiving its input energy from the system 16. Under such conditions, and as an illustration, if a surge takes place on the system 16, the result is a rapid rate of change in the dynamometer armature current with corresponding changes in speed. I provide stabilizing or damping means including the variable resistance element 90, referred to hereinbefore, for limiting the rate of change of the dynamometer armature current or preventing the armature current from changing too suddenly. In accordance with the arrangement illustrated, the resistance element 90 is connected to the secondary winding 96 of the transformer 92, and the primary winding 93 is connected across the armature resistance element 20 as already explained. With this arrangement it will be clear that the voltage induced in the secondary winding 96 and thus the potential impressed on the resistance element 90 are dependent upon the rate of change of the current flowing in the resistor 20. The slidable variable shunt resistance 90 with contact 91 provides means for changing the amount of the voltage induced in the secondary coil 96 which is introduced into the control circuit of amplifier 74. The shunt resistor 90 may be replaced by a potentiometer, if desired, but I prefer to employ the arrangment shown inasmuch as failure of the contact 91 would be more serious for a potentiometer connection here.

The voltage across the resistance 90 is introduced in the control electrode or input circuit of the amplifier 74 in such a manner or direction that, if there is a surge of current in the armature circuit, the dynamometer field excitation is altered in such a way as to oppose the change before variations in the dynamometer speed can be produced. In other words, the damping or stabilizing means just described anticipates a change in speed which would otherwise take place due to the sudden change in the armature current and acts on the control electrode 77 of the amplifying valve 74 before the pilot generator voltage has had time to undergo an appreciable change. Thus, if there is a positive rate of change in the armature current in the generating direction of current flow, the resulting potential difference in the shunt resistor 90 is impressed on the control electrode 77 in a positive direction to cause a corresponding reduction in the current in the control or field winding 13. In other words the voltage introduced into the input circuit by the stabilizing device is in the same direction as would be the change in the pilot generator voltage, if the latter only had sufficient time to become effective. Similarly, a sudden negative rate of change in the armature current will produce an increase in the current flowing in the field winding 13. The damping means thus anticipates and prevents rapid changes in speed caused by the regulator or any part of the electrical system. The device operates in a similar manner for armature current flow in the motoring direction.

The capacitor 81 which is connected between the control electrode 77 and the cathode 76 of the amplifying valve 74 partially filters out extraneous effects due to torque pulsations from the engine, commutator ripple, and poor contact at the brushes of the pilot generator. In addition, any rapid fluctuations in the voltage applied to the control electrode 77 tend to become amplified in the plate circuit of the amplifying valve 74 and are coupled back in an opposing manner on the grid 78 by means of capacitor 82 in such a way as to oppose the original effect of the control electrode 77. By means of the foregoing arrangements small transients in the pilot generator voltage are prevented from producing corresponding transients in torque. In other words the operation is slowed down just enough so that the operator is enabled to obtain a reasonably steady torque or power indication.

Although the actions of the stabilizing device and of the capacitors 81 and 82 are similar in that both tend to prevent rapid torque fluctuations, they are different in that the stabilizing device tends to make the regulator correct more rapidly for deviations in speed caused by the electrical system, whereas the filtering action of condensers 81 and 82 always makes the regulator respond more slowly. The latter may therefore cause continued oscillation or hunting, if used alone, but the former will prevent it. Although it is not always necessary I prefer to use both of these devices simultaneously, as shown.

In explaining the complete cycle of operation of the embodiment of my invention shown in Fig. 1 of the drawing, it will be assumed that it is desired to start the dynamometer 11 from rest as a motor to drive the engine 10. For this condition, it is necessary to be able to apply field current to the dynamometer independently of the speed regulator action. Therefore, at standstill the field-current regulator always takes control and any desired field current can be maintained. To start the dynamometer as a motor the speed control arm 89 is preferably moved to the right or toward a maximum speed position thereby giving the field regulating element full range of control. The switch 34 is closed to energize the various heater elements 40, 72, and 86, through transformer windings $H_1$ and $H_2$, and the other regulator elements. With the switch 18 in the open position and the contact or adjuster 19 moved to the right, the switch 15 is closed. The armature current at standstill is limited by the resistance 17 to a normal value.

Assuming that weak-field starting is being employed, the torque is smoothly and gradually increased during the starting period by increasing the field current which results when the field current adjuster 110 is moved to the right. As the dynamometer begins to rotate from standstill resulting in a corresponding decrease in armature current, the resistor 17 may be cut out of the circuit by moving the adjuster 19 to the left. To transfer to speed control the contact or speed rheostat arm 89 is moved to the left or in the direction corresponding to reduced speed until the speed actually begins to decrease or the field current to increase. This indicates that the speed regulating function has taken control and corresponds to the condition when the left-hand anode 69 of the transfer valve 68 is more positive than the right-hand anode 70. Full range of speed control is then obtained by adjusting the contact or field rheostat arm 110 to the left or to a desired minimum field setting. So long as the field current does not fall below this minimum, the speed will be held constant by the speed regulator. To transfer back to field current control the field current adjuster 110 is moved to the right until a reduction in speed is observed. This indicates that the field regulating function has taken control. The speed regulator contact 89 is then moved to the right or to a desired maximum speed setting. So long as the field current regulator is not set to produce a field current low enough to raise the motor speed beyond the predetermined maximum set by the speed adjuster 89, it will regulate the field current. Thus during normal operation in the motoring direction, in which the armature current does not exceed the maximum limit, either the field current or the speed may be maintained substantially constant. In the event that the current flowing through the armature 12 of the dynamometer tends to exceed a predetermined maximum value, the potential across the resistor 20 rises correspondingly, the anode 115 begins to conduct current, resulting in an increase in the potential of the anode 70 to increase the dynamometer field current. Thus, regardless of which of the field current or speed regulating functions are in action at the time of an overload during the motoring operation, they become ineffective to regulate during the overload period. In the case of the latter mentioned function, the control exerted by the pilot generator and the speed regulating element becomes ineffective and control is transferred from the anode 69 to the anode 70. The stabilizing device operates to limit the rate of change in the armature current as already explained.

As stated previously, the dynamometer 11 when used as a generator to constitute a load for the engine 10, may be loaded into the resistor 17 or its energy may be pumped back into the system 16 or a motor-generator set. With the dynamometer operating as a motor from the system 16 as already explained, by turning on the ignition of the engine 10 and gradually opening its fuel throttle the engine may be made to drive the dynamometer and cause its armature-current to reverse. Further increase in the input or fuel supply will tend to increase the speed with the result that the regulator if set for speed regulation will increase the dynamometer field current thereby increasing the load to restore the speed to normal. Or if field current regulation is desired, the speed will vary with the torque. The operation of the regulator is identical when the dynamometer is loaded on the resistor 17.

To obtain a better understanding of the operating cycle, assume that the dynamometer is operating under equilibrium conditions at a given speed to load the engine 10 by pumping power into any suitable absorption system such as the system 16, a motor-generator set, or the resistor 17. Under such conditions upon a decrease in the input to the engine 10, the dynamometer tends to slow down and the output voltage of the pilot generator becomes less, thereby causing the amplifier 74 to pass more current. This increase in current results in a decrease in the voltage drop through the biasing resistor 56 thereby causing the control electrodes 38 of the valves 32 and 33 to become more negative relative to their cathodes 37. Consequently, the current flowing through the control winding 13 of the dynamometer is decreased and the dynamometer speeds up until its speed is restored to its former value corresponding to the setting of the adjustable contact 89 of the potentiometer. In a similar manner, if the dynamometer load is suddenly decreased, for example, due to an increase in voltage of the system 16 or a variation in resistance 17, or if the input to the engine is increased, tending to increase the dynamometer speed, the voltage generated by the pilot generator increases, thereby causing the control electrode 77 to become more negative to increase the current delivered to the dynamometer control winding 13. The dynamometer thus becomes more heavily loaded and it slows down. Should the armature current tend to exceed the predetermined maximum value for which the contact arm 121 is set, the anode 114 of the valve 113 becomes conductive, the voltage drop through the resistor 73 increases, and the anode 69 becomes less positive. Therefore, the potential drop through the resistance element 56 decreases, resulting in a decrease in the dynamometer field current. The maximum armature current limit means will be effective to produce a maximum reduction in the field current, if need be, up to the point when the potential of the anode 69 has been lowered a sufficient amount to make it equal to that of the anode 70. Since, the potential of the anode 70 is determined by the setting of the adjustable contact or field rheostat arm 110, it will thus be obvious that it is the adjustment of this setting which determines the minimum field current which can be produced under such conditions. The stabilizing device operates for generator action in a manner similar to that already described.

When the apparatus is employed to regulate field current, with the speed regulator adjusted to its maximum-speed position, if there is a reduction in field current during either motoring or generating conditions due, for example, to fluctuations in the source of supply 30 or to variations in the field resistance, the resulting decrease in the potential drop in the resistor 41 causes the control electrode 77 of the valve 98 to become more negative relative to the cathode 76, with the result that this valve passes less current. The potential at the anode 70 and across the resistor 105 are increased with the result that the potential drop through the biasing resistor 56 is increased. Consequently, the valves 32 and 33 pass more current and the dynamometer excitation is resorted to its original value. Similarly, upon an increase in the dynamometer field current the regulator will operate to restore the field current to its original value.

As a specific illustration of a condition in the operation of the device, if the field current adjustment is set for one ampere and the speed adjustment is such that more than one ampere of field current is required, the regulator will regulate speed, because the field current anode 70 of the transfer valve 68 will be considerably less positive than the speed anode 69. Under these conditions variation of the field current adjustment 110 will affect neither the speed nor the field current. As the speed adjustment 89 is moved in a direction to increase the speed, the field current will decrease until it reaches one ampere. If it tends to fall below this value, the field current anode 70 will rapidly become more positive, take control away from the speed anode, which is gradually becoming less positive, and prevent any further decrease in the field current. If the field current adjustment is now moved in the direction to raise the field current the speed will drop. The transfer from speed regulation to field current regulation is complete. To transfer back to speed regulation the field current adjustment 110 is moved in the direction of lower field current until the speed becomes equal to the value called for by the speed adjustment setting, or the speed adjustment could be lowered to the same end. At this point the speed anode of the transfer tube 68 becomes more positive than the field current anode, and transfer takes place automatically.

It will be seen that with the minimum field current limit feature below which the speed regulator becomes ineffective, the possibility of loss of torque and stalling the engine in the case of transient speed dips is avoided. Similarly, when the regulator is regulating field current the speed regulator acts as an over-speed limit, which can be set at any desired value. Only a very small change in the bias voltage impressed on the control electrode of the amplifier 74 is necessary to obtain full range of field current on the dynamometer. The speed regulator is thus very sensitive to slight speed changes and acts to increase the field current on a slight overspeed and reduce it on a slight underspeed. Such an action will tend to hold the speed constant for resistance load, pump-back, or motor operation. By means of the overload-limit protective feature, the excitation of the dynamometer is reduced automatically whenever the armature current exceeds a safe value in the generating direction and increased automatically whenever the armature current becomes too large in the motoring direction. This feature, however, does not affect the over-all operation except to keep the armature current within limits, plus in the generating direction and minus in the motoring direction.

When the relatively small dynamometer 11 is being employed in conjunction with the larger unit 21 for testing large engines the regulator operates in the same way as already described. In this arrangement the larger unit has its field winding 23 energized from the system 16 and its energy absorption rate is varied by adjusting the field rheostat 24. The larger unit thus absorbs most of the power and the dynamometer 11 takes up the variations in power in such a way as to maintain the speed at a substantially constant value. Thus by gradually varying the rheostat 24 any desired load within the combined capacity of the two dynamometers may be imposed on the engine under test.

In Fig. 2, in which like reference characters represent corresponding parts, I have shown a modification in which the exciter of Fig. 1 comprising an amplifier of the grid-controlled rectifier type is replaced by an exciter in the form of a dynamoelectric amplifier 130 of the armature reaction-excited type. Certain features of the dynamoelectric amplifier 130 are disclosed and claimed in a copending application of E. F. W. Alexanderson and M. A. Edwards, Serial No. 281,008, filed June 24, 1939, and which is assigned to the assignee of the present application. Such a dynamoelectric amplifier is known as an amplidyne. Referring to Fig. 2, the dynamoelectric amplifier 130 is shown mechanically connected to a suitable constant speed driving means, such as a motor 131, which for convenience, may be energized from the alternating current system 30. The amplifier 130 comprises a control field winding 132, an armature winding 133, and is further provided with two sets of brushes, one set of which includes brushes 134 and 135 which are short-circuited through a conductor of low resistance and provide a path for the short-circuit current which produces one component of the exciting flux of the machine. The other set, comprising brushes 136 and 137, provide an electric power output which is amplified relative to the power supplied to the control field winding 132. The output terminals of the amplifier, 136 and 137, are connected to the field winding 13 of the dynamometer by means of a circuit which preferably includes a compensating field winding 138 and a resistor 41 which is similar to the corresponding element of Fig. 1. Inasmuch as the magnetomotive force of armature reaction produced by the output current is on the same magnetic axis as that produced by the control circuit, but oppositely directed, there exists a strong back-coupling effect between the two circuits. The principal effect of this back coupling is to reduce the sensitivity or amplification of the device, but under certain conditions it may also act to cause instability or oscillations. The compensating winding provides a magnetomotive force which opposes and substantially reduces the normal armature reaction in the direct axis of the amplifier and thus serves to neutralize the back coupling.

The amplifier 130 may also be provided with a quadrature-axis or cross field winding 139 which is shown connected across the output terminals 136 and 137 through a suitable resistance element 140. This winding is not absolutely necessary in the functioning of the system but has the advantage of reducing the current in the short circuit axis including the brushes 134 and 135 and therefore serves to reduce the losses and heating in the amplifier. In addition, the dynamoelectric amplifier 130 may be provided with a second control field 141 which is adapted to produce a magnetomotive force in opposition to that of the first control field, 132, and which is connected in shunt with the dynamometer field winding 13 and in series-circuit relation with a suitable resistance element 42. The field winding 141 is likewise not an indispensable element in the operation of the system but it serves to reduce the effects of residual magnetism in the amplifier 130 and aids in bringing the minimum obtainable value of field current more nearly to zero.

Fundamentally, the dynamoelectric amplifier 130 may be considered as a two-stage amplifier incorporated in a single machine, the first stage of amplification being from the control field winding 132 to the short-circuited brushes 134 and 135 and the second stage being from the short-circuited brushes 134 and 135 to the power or output brushes 136 and 137. The power input to the control field winding 132 of the dynamoelectric machine 130 is thus greatly amplified and this amplified output power is employed for variably energizing the field winding 13 of the dynamometer 11. This arrangement thus provides a high ratio of amplification combined with a quick and accurate response.

The control field winding 132 may be energized in accordance with the potential appearing across the conductors 53 and 57 in a manner similar to that in which the control electrodes 38 of the valves 32 and 33 of Fig. 1 are energized. In such case the control field 141 could be adjusted to aid the excitation produced by the control field 132 since the net voltage across resistors 55 and 56 can be made to go negative if necessary in order to overcome the effects of residual magnetism in the dynamoelectric amplifier. However, if a control system is desired which demands a greater ratio of power amplification than is obtainable in the dynamoelectric amplifier 130 alone, there may be introduced an additional stage such as an electronic amplifier 143. This amplifier includes an electronic valve 144 preferably of the high vacuum, high amplification, type comprising an anode 145, a cathode 146, a control electrode 147, a screen grid 148 and a suppressor grid 149. The output electrodes 145 and 146 may be energized from a suitable source of supply 150, such as a storage battery, or they may be energized by the rectifier and filter combination which is connected to the points 64 and 65, but for various reasons, I prefer to employ an independent source of supply. The screen grid 148 is connected to the positive terminal of the source of supply 150 through a resistor 151 and it is connected to the cathode 146 through a resistor 152 and a self-biasing resistor 153. The input electrodes of the amplifier 143, including the cathode 146 and the control electrode 147, are connected by means including conductors 53 and 57 to be energized in accordance with the difference between the voltages across the resistor 55 and the resistor 56, which voltage differential is dependent upon variations in the characteristics to be regulated or controlled as will be appreciated from the foregoing description in connection with the apparatus of Fig. 1. It will be further appreciated that the resistance element 41 which is connected in circuit with the field winding 13 performs the same function as does the corresponding element shown in Fig. 1 and described hereinbefore.

In view of the description in connection with Fig. 1 it is believed that a detailed description of the operation of the apparatus of Fig. 2 is unnecessary. It seems sufficient to state that the potential drop through the resistor 56 as determined by the electronic regulator 67, controls the excitation of the control field 132 and thus the dynamometer field 13 to maintain the speed of the dynamometer at a substantially constant adjustable value so long as the armature current transmitted to or from the armature 12 of the dynamometer does not exceed a predetermined maximum value and so long as the field current, as evidenced by the drop in potential through the resistor 41, is not reduced below a predetermined minimum value. If the armature current tends to exceed the maximum value, the speed of the dynamometer 11 is permitted to vary and the maximum value of dynamometer armature current is maintained. On the other hand, if the armature current is not exceeded but the field current tends to become reduced below the predetermined minimum value, the speed is permitted to vary and the minimum value of field current is maintained. As explained in connection with Fig. 1, the apparatus is also adapted to regulate the field current of the dynamometer in which case the speed is permitted to vary with the torque.

The apparatus of my invention incorporates the highly desirable features of an electronic regulator. Its lack of inertia and its high amplification factor combine to provide high sensitivity and close regulation, simplicity of operation, maintenance of the same degree of sensitivity, and freedom from excessive maintenance. Heretofore, all data involving speed required timed runs, lasting often from thirty seconds to two minutes, in order to obtain accurate speeds. The aparatus of this invention reduces the speed variable to a constant and thereby effects a considerable saving in time. It is readily adaptable to operation at various speeds and field current values. It has the further advantage of so controlling the dynamometer that power may be pumped back into the power system with stability thereby effecting a considerable saving in the cost of the testing operation. Furthermore, by virtue of the arrangement for rapidly transferring from load to friction runs in the engine testing operation, loss of time resulting in objectionable cooling in the engine cylinders is avoided.

While I have described the principle of operation of my invention, together with the apparatus which I now consider to represent the best embodiments thereof, it will be obvious to those skilled in the art that modifications and variations may be employed in carrying out the invention, and I aim therefore to cover all such modifications and variations as fall within the scope of my invention as defined in the appended claims.

What I claim as new and desire to secure by Letters Patent of the United States, is:

1. A control system for a dynamoelectric machine having an armature and a field winding comprising in combination, means responsive to the speed of said machine for varying the energization of said field winding to maintain the speed of said machine substantially constant, a second regulating device responsive to the field current of said machine for maintaining said field current substantially constant, and means responsive to a predetermined value of said field current for rendering one of said regulating devices ineffective and the other of said regulating devices effective thereby to transfer effective control of said machine from one of said regulating devices to the other.

2. A control system for a dynamoelectric machine having an armature and a field winding comprising in combination, a regulating device responsive to the speed of said machine for controlling the energization of said field winding to maintain said speed substantially constant, a second regulating device responsive to the field current of said machine for maintaining said field current substantially constant, means for setting said field current regulator to hold a predetermined value of field current, and means responsive to values of field current greater than said predetermined value for rendering said speed regulating device effective and said current regulating device ineffective and responsive to said predetermined value of field current for rendering said current regulating device effective and said speed regulating device ineffective.

3. In combination in a testing device, a prime mover to be tested, a dynamoelectric machine having an armature and a field control winding and adapted to be mechanically connected to said prime mover, means for absorbing energy from said dynamoelectric machine, means for variably energizing said field winding to maintain the speed of said prime mover substantially constant, and means responsive to the armature current of said dynamoelectric machine for modifying the action of said second mentioned means for adjusting the current in said field control winding to limit said armature current to a maximum predetermined value irrespective of speed variations of said prime mover.

4. In a device for testing prime movers, an electric generator including field and armature windings and adapted to be coupled to a prime mover to be tested, means for absorbing the power output of said generator, means for variably energizing said field winding to control the torque on said prime mover, regulating means responsive to the speed of said generator for controlling the energization of said field winding to maintain the speed substantially constant, means for modifying the action of said regulating means to limit the armature current of said generator to a predetermined maximum value, and means for modifying the action of said regulating means to control the minimum degree of energization of said field winding.

5. In a device for testing prime movers, a dynamoelectric machine having field and armature windings and adapted to be mechanically connected to the prime mover under test, said dynamoelectric machine being arranged in an electrical circuit to operate as a motor for driving said prime mover or as a generator to load said prime mover, means for energizing said field winding, means responsive to the speed of said dynamoeletric machine for controlling said field energizing means to maintain the speed of said dynamoelectric machine substantially constant during either motor or generator operation, means responsive to the armature current in the motoring direction of said dynamoelectric machine for modifying the action of said speed regulating means to limit said current to a predetermined maximum value, and means responsive to the armature current in the generating direction for modifying the action of said speed regulating means to limit said generating current to a predetermined maximum value.

6. In a device for testing prime movers, a dynamoelectric machine having field and armature windings and adapted to be mechanically connected to the prime mover under test, electrical circuit means whereby said dynamoelectric machine is adapted to operate either as a motor for driving said prime mover or as a generator for loading said prime mover, means for energizing said field winding, means responsive to the speed of said dynamoelectric machine for controlling said field energizing means whereby the torque is varied to maintain the speed of said dynamoelectric machine substantially constant during either motor or generator operation, means responsive to the armature current of said dynamoelectric machine when operating as a motor for modifying the action of said speed responsive means to limit said motoring current to a predetermined maximum value, means responsive to the armature current of said dynamoelectric machine when operating as a generator for modifying the action of said speed responsive means to limit said generator current to a predetermined maximum value, and stabilizing means for modifying the action of said speed responsive means to counteract the effect of sudden armature current changes on the speed of said dynamoelectric machine for either motor or generator operation.

7. In a device for testing prime movers, an electric dynamometer having an armature winding and adapted to be mechanically connected to the prime mover under test, electrical circuit means whereby said dynamometer is capable of operating either as a motor for driving said prime mover or as a generator for loading said prime mover, means for controlling the torque of said dynamometer, means responsive to the speed of said dynamometer for energizing said torque controlling means whereby the torque of said dynamometer is varied to maintain its speed substantially constant during either motor or generator operation, means responsive to the armature current of said dynamometer when operating as a motor for modifying the action of said speed responsive means to limit said motoring current to a predetermined maximum value, means responsive to the armature current of said dynamometer when operating as a generator for modifying the action of said speed responsive means to limit said generator current to a predetermined maximum value, and stabilizing means for modifying the action of said speed responsive means to anticipate changes in the speed of said dynamometer.

8. In a system for testing rotary devices, a dynamoelectric machine provided with field and armature windings and adapted to be mechanically coupled with the rotary device to be tested, electric circuit means associated with said armature winding, means for energizing said field winding to produce torque between said field and armature windings, a regulating element comprising means responsive to the speed of said dynamoelectric machine for controlling said field energizing means whereby the speed may be maintained substantially constant, a second regulating element comprising means responsive to the field current of said dynamoelectric machine for maintaining said field current substantially constant, and means for smoothly transferring effective control from one of said regulating elements to the other while said testing system is in operation.

9. In a system for testing prime movers, a dynamoelectric machine provided with field and armature windings and adapted to be mechanically coupled with the prime mover to be tested, electric circuit means connected to said armature winding adapted to deliver energy to or absorb energy from said dynamoelectric machine, means for energizing said field winding to vary the torque produced by said dynamoelectric machine, a regulating element comprising means responsive to the speed of said dynamoelectric machine for controlling said field energizing means whereby the speed may be maintained substantially constant, a second regulating element comprising means responsive to the field current of said dynamoelectric machine for maintaining said field current substantially constant, means for smoothly transferring effective control from one of said regulating elements to the other while said testing system is in operation, said field current regulating means being adapted to limit the minimum field current which said speed regulating element can produce when the speed regulating function is in operation, and said speed regulating element being provided with means to limit the maximum speed which said field regulating element can produce when the field current regulating function is in operation.

10. In a system for testing prime movers, a dynamoelectric machine having a field winding and an armature for producing torque in either direction, said armature being adapted to be mechanically coupled to the prime mover under test, means for exciting said field winding, a first regulating means including means responsive to the speed of said dynamoelectric machine for controlling said exciting means to vary the torque exerted by the field upon said armature in order to maintain the speed substantially constant under varying conditions of load, and a second regulating means including means responsive to the current in said field winding for controlling said exciting means to maintain said field current substantially constant, said first and second regulating means having electronic means associated therewith whereby effective control may be smoothly transferred from one of said regulating means to the other while said system is in operation.

11. In a system for testing prime movers, a dynamo-electric machine having a field winding and an armature for producing torque in either direction, said armature being adapted to be mechanically coupled to the prime mover under test, means for exciting said field winding, a first regulating means including means responsive to the speed of said dynamoelectric machine for controlling said exciting means to adjust the torque exerted by the field upon said armature in order to maintain the speed substantially constant under varying conditions of load, inductive means associated with the circuits of said armature and said first regulating means whereby the action of said regulating means is modified to counteract the effect on the speed of sudden changes in the current in said armature, a second regulating means including means responsive to the current in said field winding for controlling said exciting means to maintain said field current substantially constant, said first and second regulating means having electronic means associated therewith whereby effective control may be smoothly transferred from one of said regulating means to the other while said system is in operation.

12. In a system for testing internal combustion engines, an electric dynamometer having field and armature windings and adapted to be mechanically coupled to the engine under test, said dynamometer being adapted for connection in an electrical circuit to operate as a motor to drive said engine or as a generator to load said engine, means for exciting said field winding, regulating means operable in accordance with the speed of said dynamometer for controlling said field energizing means to vary the torque on the armature of said dynamometer whereby the speed is maintained substantially constant, a second regulating means responsive to the field current of said dynamometer for controlling said field energizing means to maintain said field current substantially constant, means for smoothly and selectively transferring control from one of said regulating means to the other while said dynamometer is in operation, means responsive to the armature current of said dynamometer in the motoring direction for modifying the action of said speed or field current responsive means to limit said armature current to a predetermined maximum value, and means responsive to the armature current of said dynamometer in the generating direction for modifying the action of said speed responsive means to limit said armature current to a predetermined maximum value.

13. In combination in a device for testing internal combustion engines and the like, a dynamoelectric machine having a field winding and an armature for producing torque, said armature being adapted to be mechanically coupled to the engine under test, means for exciting said field winding, electronic means comprising a pair of arc discharge paths each including a plurality of electrodes, one electrode of one path being maintained at substantially the same potential as the corresponding electrode of the other path and the other electrodes being electrically free relative to each other, means included in the circuit of said electronic means and electrically common to both of said paths for deriving potential variations determined by the conductivity of said electronic means, means for impressing on one of said free electrodes a potential which varies in accordance with the speed of said dynamoelectric machine, means for impressing on the other of said free electrodes a potential which varies in accordance with the current in said field winding, and means energized in accordance with said derived potential variations for controlling said field exciting means, whereby the excitation of said field winding is selectively controlled from that one of said potential impressing means which maintains the predominant potential difference between the respective electrodes of its associated discharge path.

14. In combination in a device for testing prime movers, a dynamoelectric machine mechanically connected to said prime mover and capable of operating either as a motor or as a generator, a field winding for said dynamoelectric machine, a power system, means for connecting the armature of said dynamoelectric machine to said power system, means for energizing said field winding and including an amplifier having an input circuit, a pilot generator for producing a voltage proportional to the speed of said prime mover, a first electric valve means having an input and an output circuit, means connecting said pilot generator voltage in the input circuit of said valve means, a second electric valve means having an input and an output circuit, means for energizing said input circuit in accordance with variations in the current in said field winding, an electronic valve comprising a pair of anodes and a common cathode, said electronic valve having the characteristic that current flows to the cathode only from that anode which is maintained at the higher positive potential, means whereby one of said anodes is subjected to potential variations determined by the flow of current in the output circuit of said first valve means, means whereby the other of said anodes is subjected to potential variations determined by the flow of current in said second valve means, an impedance element connected in said common cathode circuit for deriving a potential which varies in accordance with the conductivity of said transfer valve, and means for impressing said derived potential variations on the input circuit of said amplifier, whereby the energization of said field winding is controlled from that circuit which produces the predominant potential on said respective anodes, and means associated with the respective input circuits of said first and second valve means for changing their standards of operation, the adjustment of the means associated with said first valve means serving to limit the maximum speed of said dynamoelectric machine when said transfer valve is being controlled from said second valve means, and the adjustment of the means associated with said second valve means serving to limit the minimum field current of said dynamoelectric machine when said transfer valve is being controlled from said first valve means.

15. In combination in the device for testing internal combustion engines and the like, a dynamoelectric machine, having a control field winding and an armature for producing torque, said armature being adapted to be coupled to the engine under test, means including an amplifier having an input circuit for exciting said field winding, electronic means including a pair of electronic conducting paths each including anode and cathode electrodes, one of said electrodes being electrically common to each electronic path and said other electrodes being electrically free with respect to each other, said electronic means having the characteristic that only that path having the greater potential difference between its respective electrodes becomes conductive, means for impressing on one of said free electrodes a potential which varies in accordance with the speed of said machine, means for impressing on the other free electrode a potential which varies in accordance with the field current of said machine, and means associated with said common electrode circuit and the input circuit of said field exciting means whereby said exciting means is controlled from that one of said means connected to the respective free electrodes which produces the predominant potential difference relative to said common electrode.

16. In a system for testing internal combustion engines, an electric generator for loading said engines including a field winding, a pilot generator, said generator being adapted to be mechanically coupled to an engine to be tested, an amplifier having an input and an output circuit, means connecting said field winding in the output circuit of said amplifier, means connecting said pilot generator to the input circuit of said amplifier, whereby said field winding is energized to regulate the speed of said generator, means associated with said amplifier for changing the standard of operation to provide regulation over a wide speed range, and means associated with the input circuit of said amplifier for counteracting the effect on the speed of sudden changes in the armature current of said generator.

17. In a system for testing prime movers, an electric dynamometer including a rotary element and an armature winding, said rotary element being adapted to be mechanically coupled to a prime mover to be tested, an amplifier having an input and an output circuit, means for controlling the torque on said dynamometer to regulate the speed thereof, said torque controlling means being energized in accordance with the output current of said amplifier, a pilot generator connected for obtaining a voltage proportional to the speed of said dynamometer, means connecting said pilot generator in the input circuit of said amplifier whereby said control means is variably energized to change the torque of said dynamometer, means associated with said amplifier for changing the standard of operation to provide regulation over a range in speed, and means associated with the input circuit of said amplifier for stabilizing the operation of said system to prevent oscillation or hunting.

18. In combination in a device for testing prime movers, power absorption means coupled to said prime mover and having a control winding whereby a load of controllable power-speed characteristics may be imposed on said prime mover, a control field winding for said absorption means, means for exciting said field winding and including an amplifier having an input circuit, a double-anode vacuum tube, a first means for impressing on one of the anodes of said tube positive potentials which vary in accordance with the speed of said absorption means, a second means for impressing on the other anode of said tube positive potentials which vary in accordance with the current in said control winding, an impedance element connected in circuit with said tube and subject to potential variations dependent upon the conductivity of said tube, means for impressing said potential variations on the input circuit of said amplifier to control the flow of current in said field winding, and means for determining which of said first or second means shall exert effective control, said means being adjustable whereby either speed or field current regulation may be obtained throughout range.

RICHARD W. PORTER.